United States Patent
Takiguchi et al.

(10) Patent No.: US 7,170,831 B2
(45) Date of Patent: Jan. 30, 2007

(54) OPTICAL PICKUP ASTIGMATISM MEASURING METHOD, OPTICAL PICKUP ASTIGMATISM ADJUSTING METHOD, AND OPTICAL PICKUP ASTIGMATISM MEASURING SYSTEM

(75) Inventors: Hitoshi Takiguchi, Saitama-ken (JP); Hidekazu Ouchi, Saitama-ken (JP); Yasushi Kumamaru, Saitama-ken (JP); Naoki Yamada, Saitama-ken (JP); Tetsuya Murakami, Saitama-ken (JP); Yoshinari Kuwabara, Saitama-ken (JP); Ko Ishii, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 539 days.

(21) Appl. No.: 10/776,194

(22) Filed: Feb. 12, 2004

(65) Prior Publication Data
US 2004/0240336 A1 Dec. 2, 2004

(30) Foreign Application Priority Data
Feb. 18, 2003 (JP) ............................... 2003-039652

(51) Int. Cl.
*G11B 7/00* (2006.01)
(52) U.S. Cl. ............................ 369/44.23; 369/44.27; 369/44.32; 369/44.34
(58) Field of Classification Search ...................... None
See application file for complete search history.

(56) References Cited

U.S. PATENT DOCUMENTS

| | | | | |
|---|---|---|---|---|
| 5,673,241 | A | * | 9/1997 | Koyama et al. ......... 369/44.23 |
| 6,798,723 | B2 | * | 9/2004 | Hayashi et al. .......... 369/44.23 |
| 2002/0071365 | A1 | * | 6/2002 | Yanagawa ................ 369/53.19 |

FOREIGN PATENT DOCUMENTS

JP 2002-015435 1/2002

* cited by examiner

*Primary Examiner*—Muhammad Edun
(74) *Attorney, Agent, or Firm*—Arent Fox PLLC

(57) ABSTRACT

It is an object of the present invention to provide an optical pickup astigmatism adjusting method capable of easily correcting an astigmatism even if the spot shape of a light beam converged on an optical disc is not a true circle. An optical pickup astigmatism adjusting system of the present invention finds an inter-focal distance $L_0$ between a focal position where a light beam is converged in RAD direction and another focal position where a light beam is converged in TAN direction, and a further inter-focal distance $L_{45}$ between a focal position where a light beam is converged in a direction inclined 45 degrees from RAD direction and another focal position where a light beam is converged in a direction inclined 45 degrees from TAN direction, thereby measuring an astigmatism in accordance with the inter-focal distances $L_0$ and $L_{45}$. Then, an installation angle of a reflection mirror is adjusted in accordance with the inter-focal distances $L_0$ and $L_{45}$, thus correcting the astigmatism.

5 Claims, 13 Drawing Sheets

OPTICAL PICKUP ASTIGMATISM MEASURING METHOD, OPTICAL PICKUP ASTIGMATISM ADJUSTING METHOD, AND OPTICAL PICKUP ASTIGMATISM MEASURING SYSTEM

BACKGROUND OF THE INVENTION

The present invention relates to an astigmatism measuring method, an astigmatism adjusting method and an astigmatism measuring system, all for an optical pickup which applies a light beam converged by an objective lens to a recording medium.

The present application claims priority from Japanese Application No. 2003-39652, the disclosure of which is incorporated herein by reference.

For example, with an optical pickup for use in recording/reproducing information on an optical disk such as CD or DVD, it is required to correctly and constantly converge a light beam (for writing or reproducing information) on information pit train on the surface of the optical disk. Because of this, it is absolutely necessary to reduce as much as possible an aberration (specifically, an astigmatism) of the optical system of the optical pickup.

In order to measure an astigmatism of an optical pickup, it is usual to employ a method using a laser interferometer. However, this method needs considerable working time and requires an experienced labor for correctly making coincidence between the optical axis of the laser interferometer and that of the optical pickup, thus rendering it unsuitable for adjusting the optical system of an optical pickup in an actual manufacturing process.

In order to solve the above problem, Japanese Unexamined Patent Application Publication No. 2002-15435 has suggested an improved method for adjusting an astigmatism of an optical pickup, which can be used with an easy manner in an actual manufacturing process. As shown in FIG. 11 of the published patent application, the suggested adjustment method requires that a spot image (light beam sectional shape along a direction orthogonal to the advancing direction of the light beam) of a light beam converged near the focus of an optical pickup be taken as image data into a processing system, thereby image-processing and measuring a roundness (aspect ratio) of the spot image. Then, an incident angle of the light beam entering the objective lens is changed such that the roundness of the spot image becomes maximum (almost equal to 1), thereby correcting the astigmatism of an optical pickup.

However, the above-mentioned astigmatism adjusting method requires a precondition that the incident angle of a light beam is changed to finally obtain a spot image which is a true circle (or a generally true circle). Namely, since the above-mentioned adjusting method takes a spot image of true circle as an adjustment standard, it was found difficult to minimize an astigmatism by such an astigmatism adjusting method (if the objective lens of an optical pickup has an inherent aberration and hence a converged spot image fails to become a true circle even though the incident angle of the light beam is adjusted). In other words, if the above-mentioned astigmatism adjusting method is to be used for performing an optimum astigmatism adjustment, it is necessary to use high quality optical elements (having less astigmatism) to construct the optical system of an optical pickup with a high precision, so as to render the spot image to become a true circle.

SUMMARY OF THE INVENTION

The present invention has been accomplished in view of the above problem and it is an object of the invention to provide an improved astigmatism measuring method and an improved astigmatism measuring system, as well as an improved astigmatism adjusting method capable of easily correcting an astigmatism by using the astigmatism measuring method, without relying upon a precision of the optical system of an optical pickup and without requiring that the spot shape of a light beam converged by an objective lens be a true circle.

According to one aspect of the present invention, there is provided an astigmatism measuring method for measuring an astigmatism of an optical pickup which applies a light beam converged by an objective lens to a recording medium, the method comprising: a first step of finding a first position in an advancing direction of the light beam, which first position causes the beam diameter of the light beam to become minimum in a first direction orthogonal to the advancing direction of the light beam; a second step of finding a second position in an advancing direction of the light beam, which second position causes the beam diameter of the light beam to become minimum in a second direction orthogonal to both the advancing direction of the light beam and the first direction; a third step of finding a first distance representing a difference between the first position and the second position in the advancing direction of the light beam; a fourth step of finding a third position in the advancing direction of the light beam, which third position causes the beam diameter of the light beam to become minimum in a third direction orthogonal to the advancing direction of the light beam and inclining 45 degrees from the first direction; a fifth step of finding a fourth position in the advancing direction of the light beam, which fourth position causes the beam diameter of the light beam to become minimum in a fourth direction orthogonal to both the advancing direction of the light beam and the third direction; and a sixth step of finding a second distance representing a difference between the third position and the fourth position in the advancing direction of the light beam. Specifically, an astigmatism of the optical pickup is measured in accordance with the first distance and the second distance.

According to another aspect of the present invention, there is provided an astigmatism adjusting method for adjusting an astigmatism of an optical pickup which applies a light beam converged by an objective lens to a recording medium, the method comprising: a first step of finding a first position in an advancing direction of the light beam, which first position causes the beam diameter of the light beam to become minimum in a first direction orthogonal to the advancing direction of the light beam; a second step of finding a second position in an advancing direction of the light beam, which second position causes the beam diameter of the light beam to become minimum in a second direction orthogonal to both the advancing direction of the light beam and the first direction; a third step of finding a first distance representing a difference between the first position and the second position in the advancing direction of the light beam; a fourth step of finding a third position in the advancing direction of the light beam, which third position causes the beam diameter of the light beam to become minimum in a third direction orthogonal to the advancing direction of the light beam and inclining 45 degrees from the first direction; a fifth step of finding a fourth position in the advancing direction of the light beam, which fourth position causes the fourth direction orthogonal to both the advancing direction of the light beam and the third direction; a sixth step of finding a second distance representing a difference between the third position and the fourth position in the advancing direction of the light beam; and a seventh step of measuring an astigmatism of the optical pickup in accordance with the first distance and the second distance. Specifically, the astigmatism of the optical pickup is adjusted in accordance with the measurement result obtained in the seventh step.

According to a further aspect of the present invention, there is provided an astigmatism measuring system for measuring an astigmatism of an optical pickup which applies a light beam converged by an objective lens to a recording medium, the system comprising: measurement unit and operation unit. Specifically, the measurement unit is provided for measuring: a first position in an advancing direction of the light beam, which first position causes the beam diameter of the light beam to become minimum in a first direction orthogonal to the advancing direction of the light beam; a second position in an advancing direction of the light beam, which second position causes the beam diameter of the light beam to become minimum in a second direction orthogonal to both the advancing direction of the light beam and the first direction; a third position in the advancing direction of the light beam, which third position causes the beam diameter of the light beam to become minimum in a third direction orthogonal to the advancing direction of the light beam and inclining 45 degrees from the first direction; and a fourth position in the advancing direction of the light beam, which fourth position causes the beam diameter of the light beam to become minimum in a fourth direction orthogonal to both the advancing direction of the light beam and the third direction. In particular, the operation unit is provided for finding a first distance representing a difference between the first position and the second position in the advancing direction of the light beam, as well as a second distance representing a difference between the third position and the fourth position in the advancing direction of the light beam. Specifically, the astigmatism of the optical pickup is measured in accordance with the first distance and the second distance.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
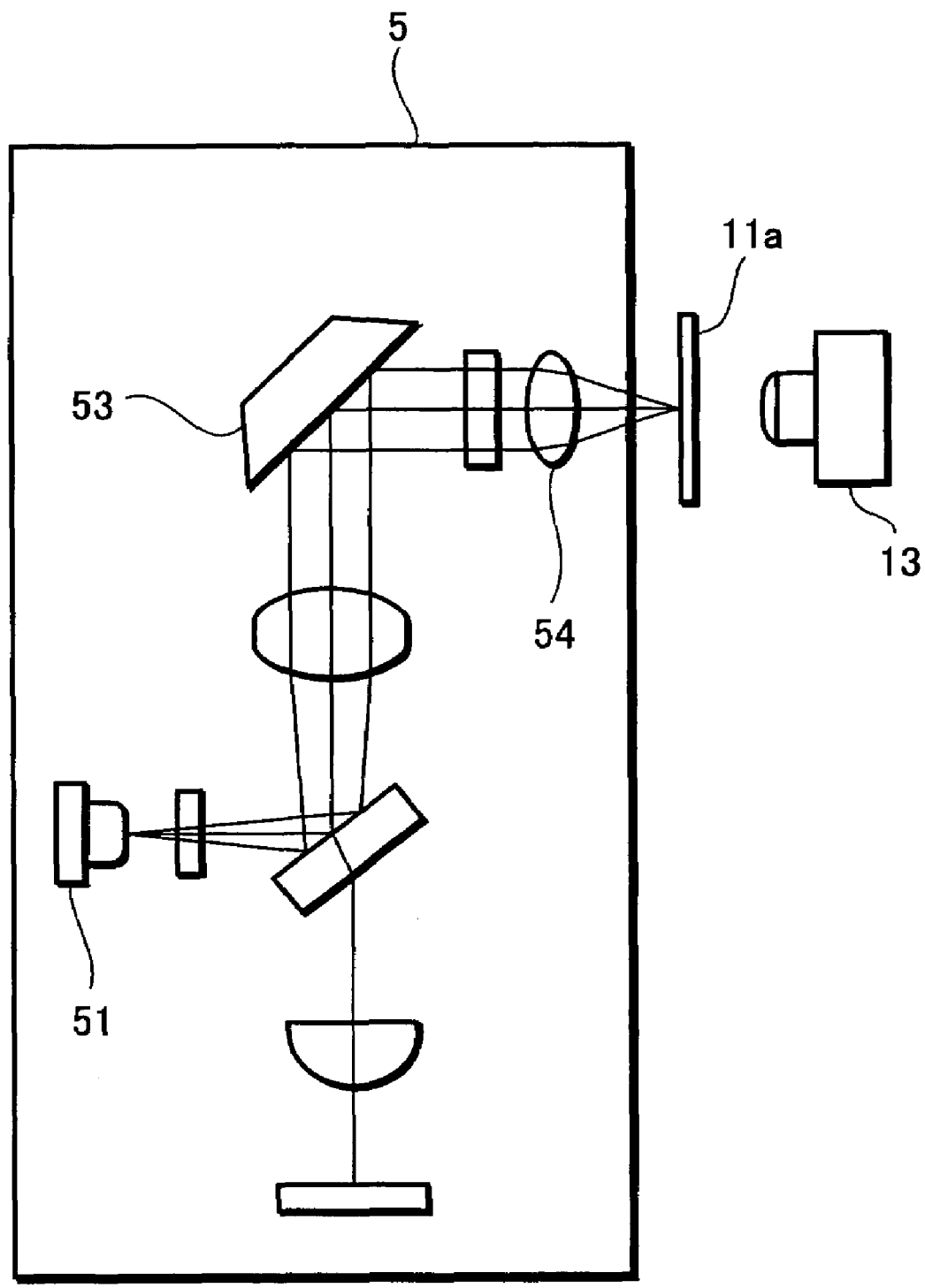
FIG. 1 is an explanatory view showing an astigmatism measuring and adjusting method according to an embodiment of the present invention.

A preferred embodiment of the present invention will be described in the following with reference to the accompanying drawings. FIG. 1 is an explanatory view showing a method of measuring an astigmatism of an optical pickup 5 and adjusting the astigmatism in accordance with the measurement result.

As shown in FIG. 1, an optical pickup 5 for use in an optical disk recording/reproducing apparatus comprises a laser diode 51 serving as a light source of a light beam for carrying out information recording/reproducing on an optical disk, a reflection mirror 53 for changing the optical path of a light beam and an objective lens 54 for converging the light beam. A light beam emitted from the laser diode 51 is reflected by the reflection mirror 53, and then converged by the objective lens 54 so as to be focused onto a position corresponding to the recording surface of an optical disk (not shown).

In carrying out an astigmatism measurement and adjustment, the optical pickup 5 applies a light beam to a cover glass 11a serving as a projection plane, thereby projecting a spot image. An image pick-up device 13 picks up the spot image projected on the cover glass 11a.

A procedure for carrying out the astigmatism adjusting method will be described below. At first, the position of the objective lens 54 is adjusted. Then, while appropriately changing a distance between the focus of the light beam and the cover glass 11a (hereinafter referred to as defocusing amount), spot images Pn of the light beam projected on the cover glass 11a are successively picked-up by the image pick-up device 13. Subsequently, the diameters of the picked-up spot images Pn are measured.

Figure 2:
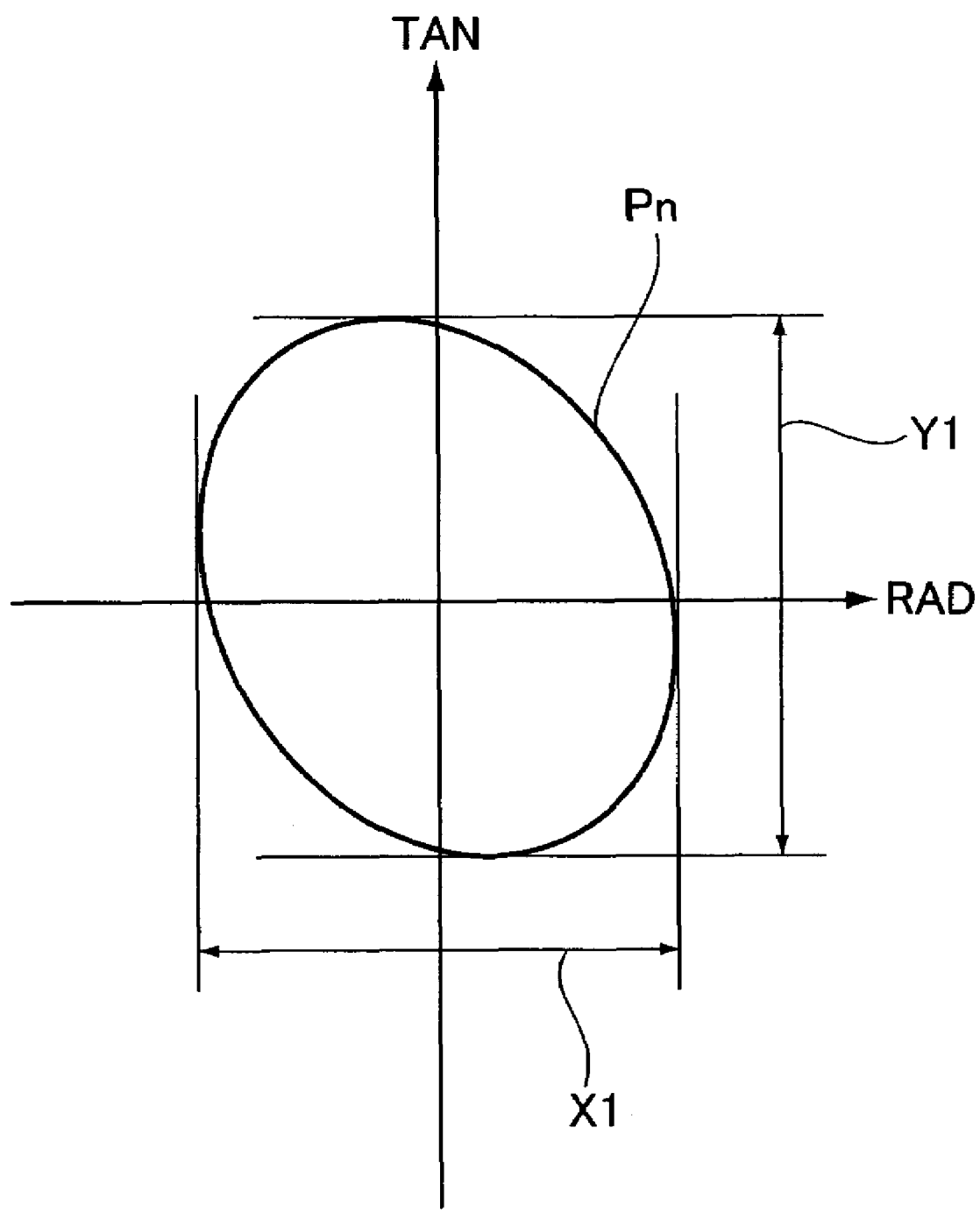
FIG. 2 is an explanatory view showing a method of measuring diameters of spot image.

In detail, as shown in FIG. 2, the respective spot images Pn successively picked-up in the above-described manner are subjected to a measurement such that spot diameter X1 in RAD direction (defined as a first direction) and spot diameter Y1 in TAN direction (orthogonal to the first direction and defined as a second direction) are measured. Here, RAD (Radial) direction is a radial direction when the optical disk has been loaded, while TAN (Tangential) direction is a tangential direction.

Figure 3:
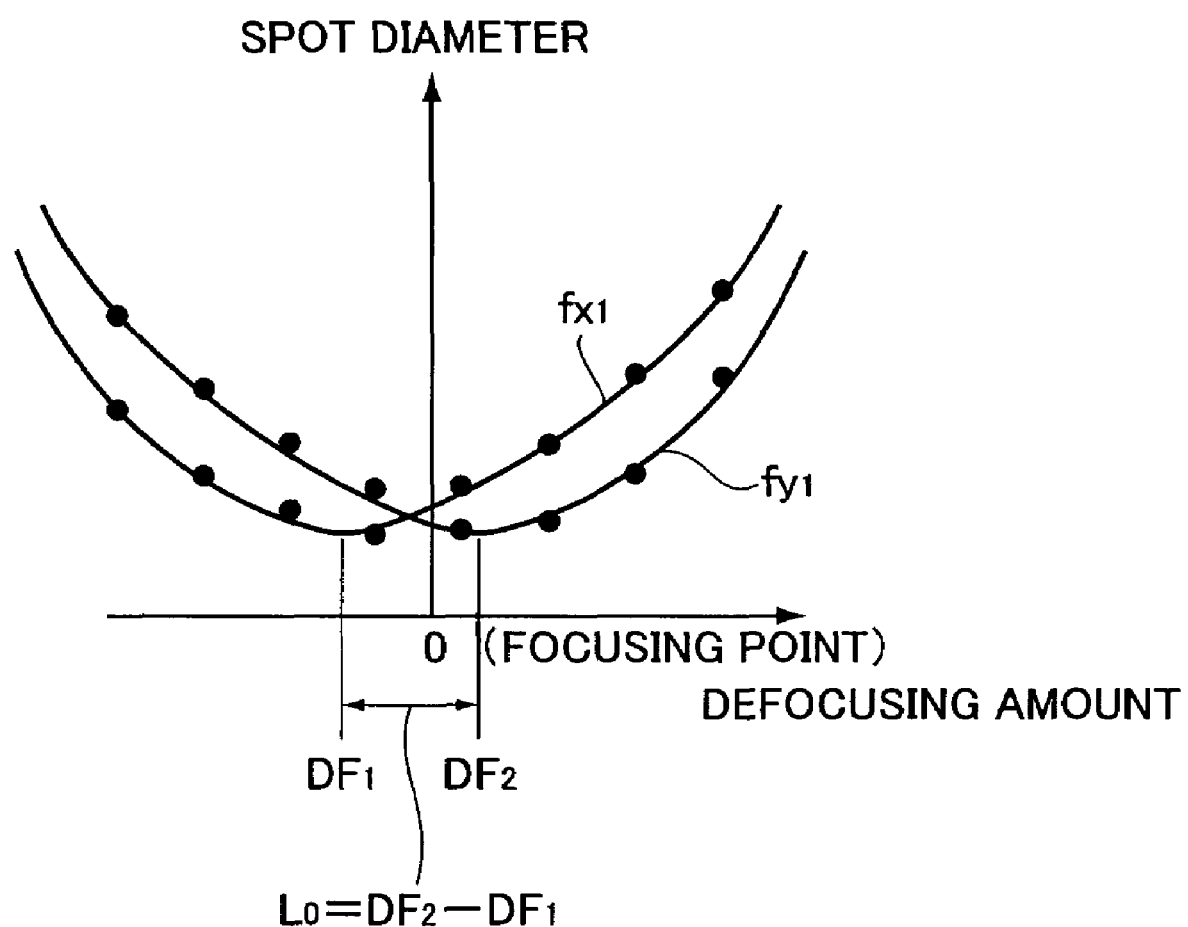
FIG. 3 is a graph showing a relationship between defocusing amount and spot diameter.

Next, measurement results of the above-mentioned spot images Pn are used to establish characteristic curves fx1 and fy1 representing a relationship between defocusing amount and spot diameters X1, Y1, as shown in FIG. 3. Then, characteristic curve fx1 is used to find a value $DF_1$ corresponding to a defocusing amount which causes the spot diameter X1 to become minimum, while characteristic curve fy1 is used to find a value $DF_2$ corresponding to a defocusing amount which causes the spot diameter Y1 to become minimum. Subsequently, a value $L_0$ is found which represents a difference between these two values, i.e., $L_0=DF_2-DF_1$. In this way, the value $L_0$ thus found represents a distance between a focal position when the light beam is converged in RAD direction and another focal position when the light beam is converged in TAN direction (hereinafter referred to as inter-focal distance).

Afterwards, the picked-up respective spot images Pn are subjected to a further measurement so as to measure a spot diameter X2 in a third direction inclining 45 degrees from the first direction, as well as to measure a spot diameter Y2 in a direction orthogonal to the third direction, thereby finding an inter-focal distance $L_{45}$ through the same computation.

Figure 4:
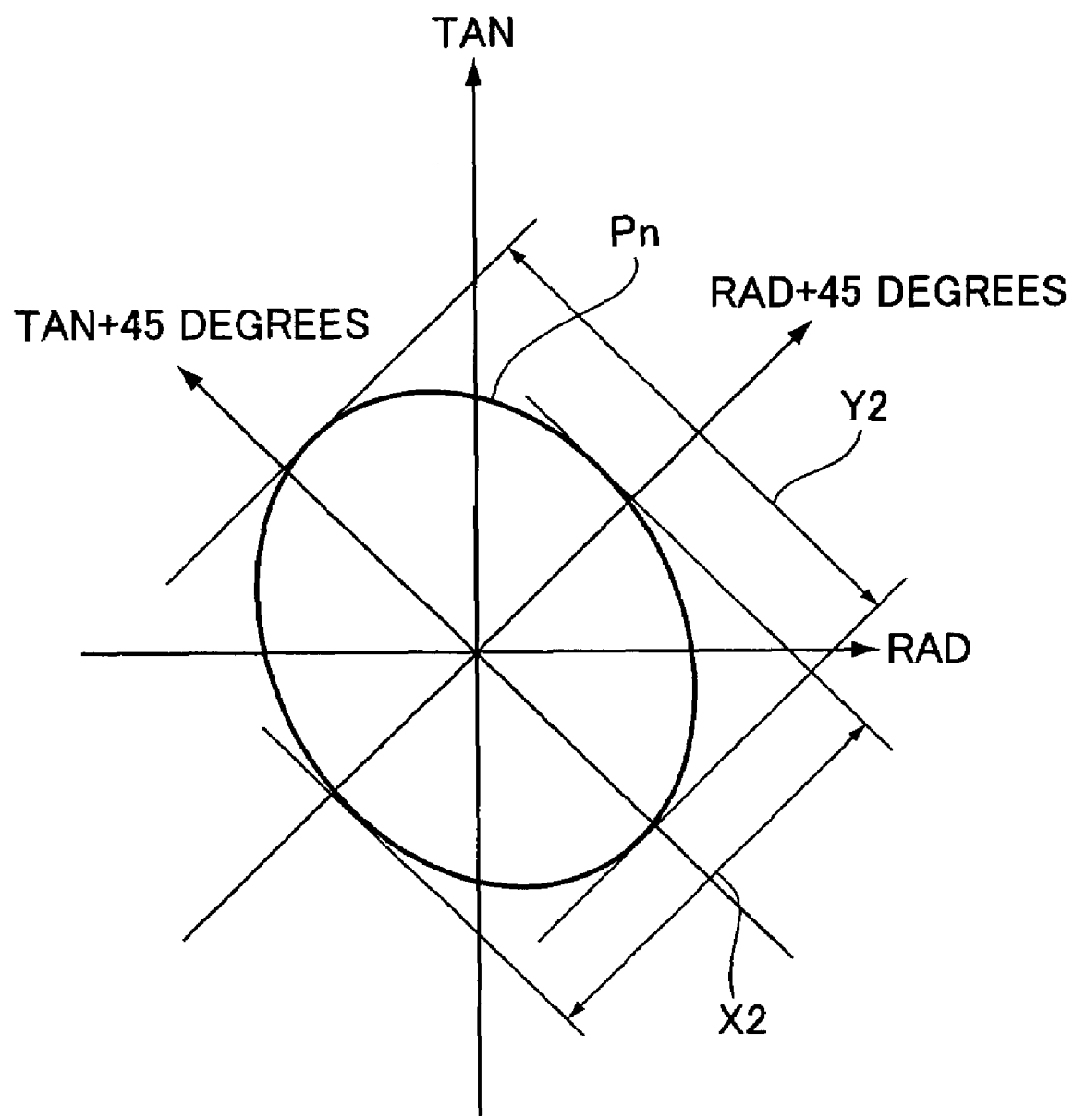
FIG. 4 is an explanatory view showing a method of measuring diameters of spot image.
Figure 5:
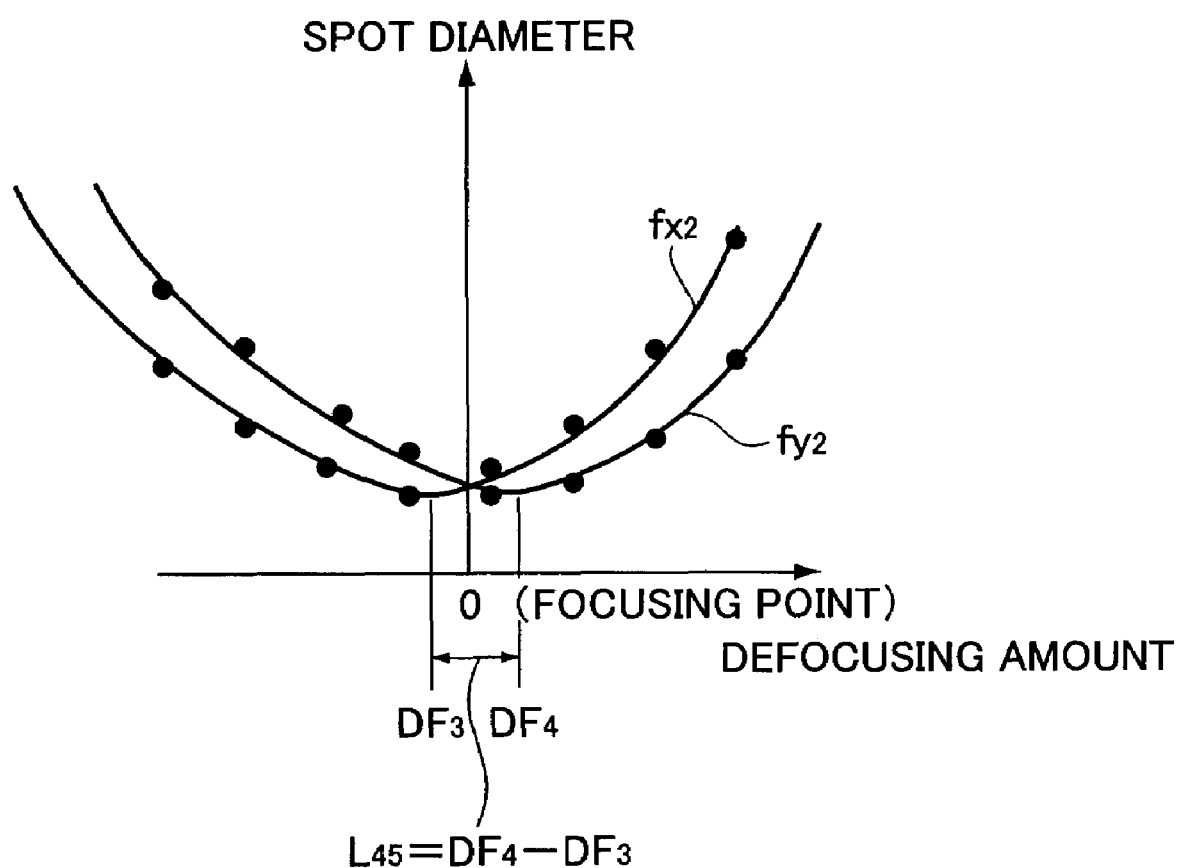
FIG. 5 is a graph showing a relationship between defocusing amount and spot diameter.

Namely, as shown in FIG. 4, the respective spot images Pn are treated so as to measure a spot diameter X2 in a third direction inclining 45 degrees from RAD direction, as well as to measure a spot diameter Y2 in a fourth direction inclining 45 degrees from TAN direction. Then, as shown in FIG. 5, characteristic curves fx2, fy2 showing a relationship between defocusing amounts and various spot diameters X2, Y2 are established so as to find values $DF_3$, $DF_4$ corresponding to defocusing amounts which cause spot diameters X2, Y2 to become minimum. Furthermore, an inter-focal distance $L_{45}$ is found which represents a difference between the above two values, i.e., $L_{45}=DF_4-DF_3$.

Here, it has been found that the inter-focal distances $L_0$, $L_{45}$ have an extremely high correlation with an astigmatism measured by the interferometer of an optical pickup 5. Namely, it is possible to measure an astigmatism of the optical pickup 5 by finding the inter-focal distances $L_0$, $L_{45}$.

Next, an astigmatism of the optical pickup 5 is adjusted in accordance with the measurement results obtained by using the above-mentioned astigmatism measuring method. In more detail, the inter-focal distances $L_0$, $L_{45}$ are used to adjust the angles of the reflection mirror 53 with respect to RAD and TAN directions, thereby changing an incident angle of the light beam entering the objective lens 54 and thus correcting the astigmatism.

However, before carrying out the astigmatism adjusting method, it is required to at first conduct a calculation to establish a relational expression representing a relationship between the inter-focal distances $L_0$, $L_{45}$ and an installation angle of the reflection mirror 53. Then, a plurality of optical pickups are employed to establish an equation by performing an actual mounting operation. Subsequently, during an astigmatism adjustment, the relational expression is used to calculate an appropriate angle (for the reflection mirror 53) corresponding to calculated inter-focal distances $L_0$ and $L_{45}$, thereby adjusting the installation angle of the reflection mirror 53 in accordance with the calculated angle.

According to the astigmatism measuring method and the astigmatism adjusting method of the present invention, it is required to calculate an inter-focal distance between a focal position when the light beam is converged in RAD direction and another focal position when the light beam is converged in TAN direction. Further, since the inter-focal distance $L_0$ does not contain 45-degree component of an astigmatism, such 45-degree component should be calculated by calculating an inter-focal distance $L_{45}$ between a focal position when the light beam is converged in a direction inclining 45 degrees from RAD direction and another focal position when the light beam is converged in a direction inclining 45 degrees from TAN direction. Here, since there is a correlation between the inter-focal distances $L_0$, $L_{45}$ and 0-degree component as well as 45-degree component of each astigmatism, an astigmatism of the optical pickup 5 can be measured by calculating these inter-focal distances.

Moreover, since an astigmatism is measured based on these inter-focal distances, it is also possible to highly accurately perform astigmatism measurement or adjustment on an optical pickup even when it is in a non-aberration (astigmatism is zero) state in which the spot shape of its light beam is elliptical.

In addition, since a relational expression established beforehand is used to calculate an appropriate angle for use in adjusting the reflection mirror (which angle corresponds to inter-focal distances) so as to adjust an inclining angle of the reflection mirror in accordance with the calculated angle and thus correct an astigmatism, it is allowed to perform an optimum adjustment of an astigmatism in only one operation, thereby simplifying the adjustment operation.

(Detailed Embodiment)

Next, an appropriate and more detailed embodiment of the present invention will be described with reference to the accompanying drawings. However, the present embodiment will be given by explaining an automatic adjustment of an astigmatism of an optical pickup used in a DVD (Digital Versatile Disc) recording/reproducing apparatus.

Figure 6:
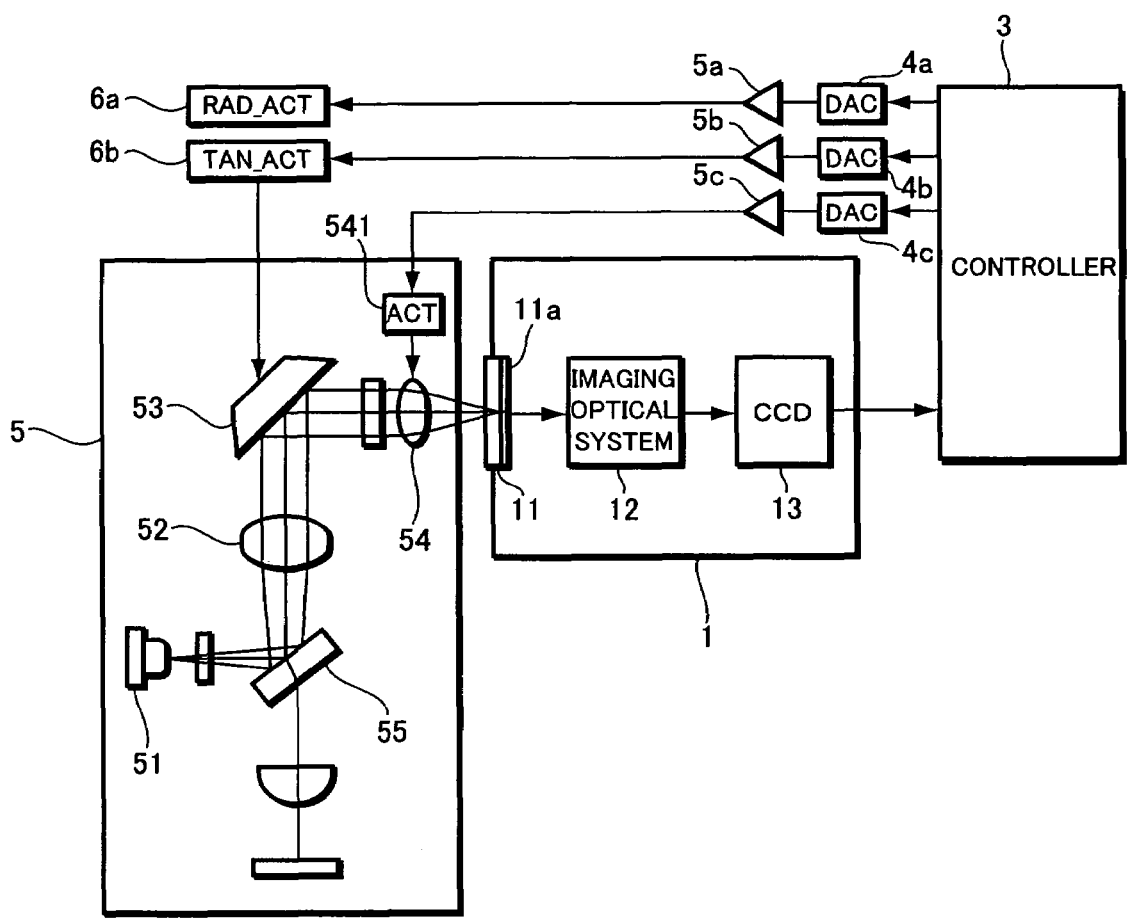
FIG. 6 is a block diagram showing an astigmatism adjusting system according to an embodiment of the present invention.

FIG. 6 is a block diagram showing an optical pickup 5 and the constitution of a system for adjusting an astigmatism of the optical pickup. As shown in the drawing, the astigmatism adjusting system of the present embodiment comprises an image processor 1 for receiving (as image data) spot images of a light beam emitted from the optical pickup 5, a controller 3 for measuring an astigmatism using the received spot images and for producing command signals for adjusting the astigmatism in accordance with measurement result, a plurality of D/A converters 4a, 4b, and 4c for converting the command signals outputted from the controller 3 into analog values, a plurality of amplifiers 5a, 5b, and 5c for amplifying command signals outputted from the D/A converters, and a pair of swinging actuators 6a, 6b.

Here, the controller 3 is a computer system including an MPU (micro-processor unit), a memory and an input/output unit for inputting/outputting image data or command signal, and can measure and adjust an astigmatism in accordance with a system program set in advance in the memory.

The optical pickup 5 includes a laser diode 51, a half mirror 55, a collimator lens 52, a reflection mirror 53, and an objective lens 54.

The laser diode 51 serves as a laser light source to emit a light beam (for recording/reproducing information on DVD) to the half mirror 55. The half mirror 55 allows part of an incident light to transmit therethrough and reflects another part thereof, so that part of the light beam from the laser diode 51 is reflected onto the collimator lens 52. The collimator lens 52 renders the reflected light beam to become a collimated light. In this way, there is formed an infinite system optically existing between the collimator lens 52 and the objective lens 54. The reflection mirror 53 is provided to reflect the collimated light from the collimator lens 52 onto the objective lens 54. The objective lens 54 is provided for forming a light beam into a focal spot on the information recording surface (containing information pits) of a DVD. Therefore, during an astigmatism adjustment, the objective lens 54 can be used to converge the light beam onto a cover glass 11 of the image processor 1.

The image processor 1 comprises the cover glass 11 which projects spot images of the light beam from the optical pickup 5, an imaging (image formation) optical system 12 which enlarges the projected spot images and effects image-formation, and CCD (Charge Coupled Device) element 13 which converts the enlarged spot images into electrical signals.

Figure 7:
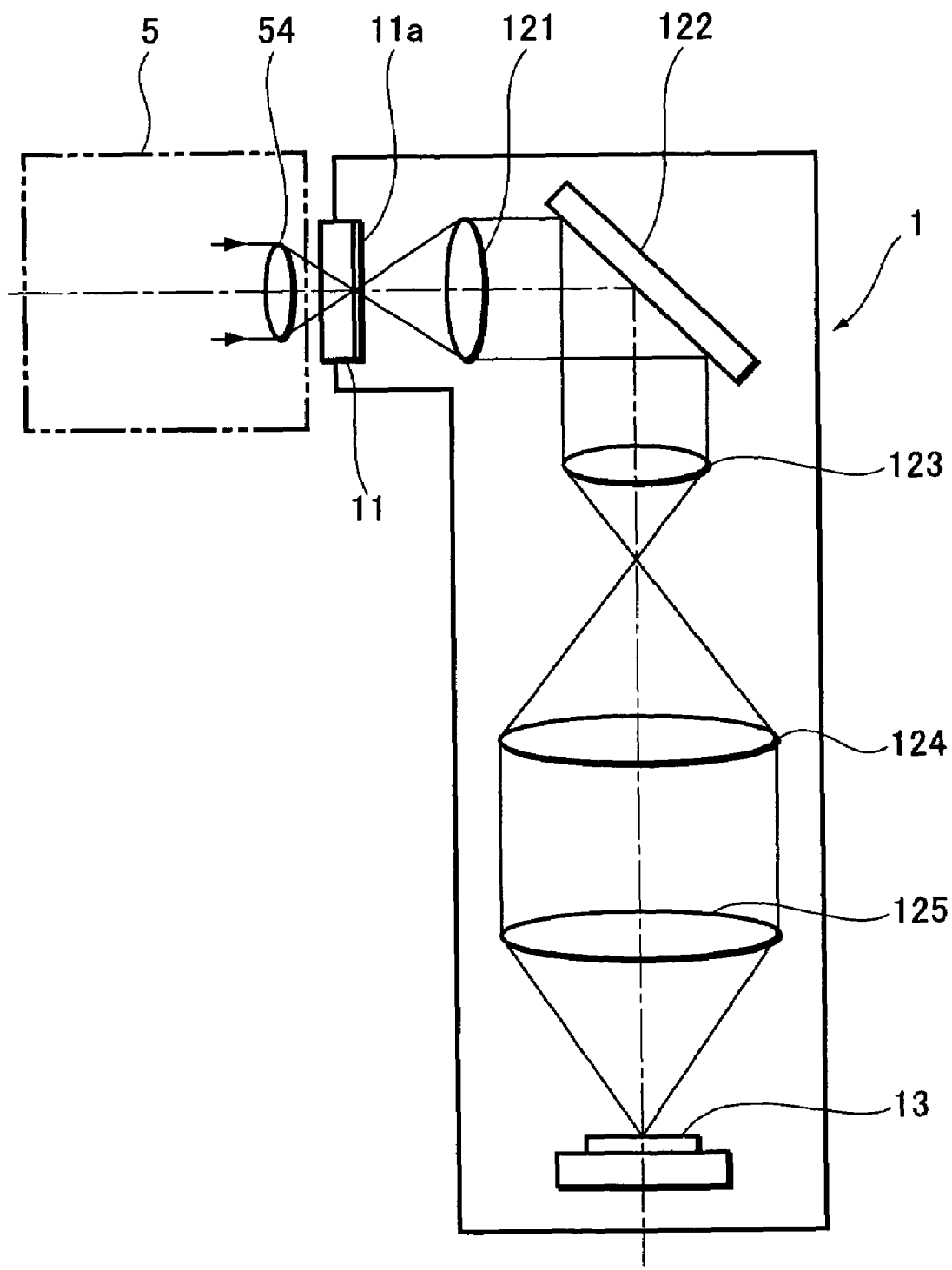
FIG. 7 is a block diagram showing the constitution of an image processor according to the embodiment of the present invention.

FIG. 7 is an explanatory view showing the constitution of the image processor 1. In detail, the cover glass 11 consists of a transparent plate-shaped glass and has a thickness serving as an optical distance corresponding to a polycarbonate layer (0.6 mm) used in DVD (i.e., corresponding to an optical distance from the surface of DVD to its information recording surface). The backside of the cover glass 11 is a semi-transparent half-mirror surface 11a formed by vapor deposition. In this way, a focusing servo can be effected by virtue of a reflected light from the half-mirror surface 11a, while spot images can be projected by virtue of a transmitted light penetrating the half mirror surface 11a.

The imaging optical system 12 comprises an objective lens 121, a reflection mirror 122, convex lenses 123 and 124, and an imaging lens 125. In operation, the imaging optical system 12 uses the objective lens 121 to converge spot image projected on the half-mirror surface 11a and then changes its optical path trough the reflection mirror 122. Afterwards, spot image is enlarged by virtue of the convex lenses 123,124 having different focal lengths. Then, spot image is formed on the CCD element 13 by means of the imaging lens 125. Subsequently, the CCD element 13 converts the formed spot image into electrical signal so as to be outputted to the controller 3.

The D/A converters 4a, 4b, and 4c operate to convert command signals from the controller 3 into analog values so as to be outputted to the amplifiers 5a, 5b, and 5c respectively. Then, based on the command signals from the D/A converters 4a and 4b, the amplifiers 5a and 5b output driving voltages for driving the swinging actuators 6a and 6b. Moreover, in accordance with the command signal from the D/A converter 4c, the amplifier 5c outputs a driving voltage for driving an actuator 541 of the objective lens 54.

Here, the swinging actuators 6a and 6b are electric-operated gonio-stages each of which can swing at an angle based on a driving voltage, and are connected to the reflection mirror 53. Specifically, the swing actuator 6a swings the reflection mirror 53 in RAD direction so as to cause the optical axis of the light beam to change in RAD direction, while the swing actuator 6b swings the reflection mirror 53 in TAN direction so as to cause the optical axis of the light beam to change in TAN direction.

The actuator 541 is provided within the optical pickup 5 to move the objective lens 54 in the direction of the optical axis, thereby changing a defocusing amount.

Figure 8:
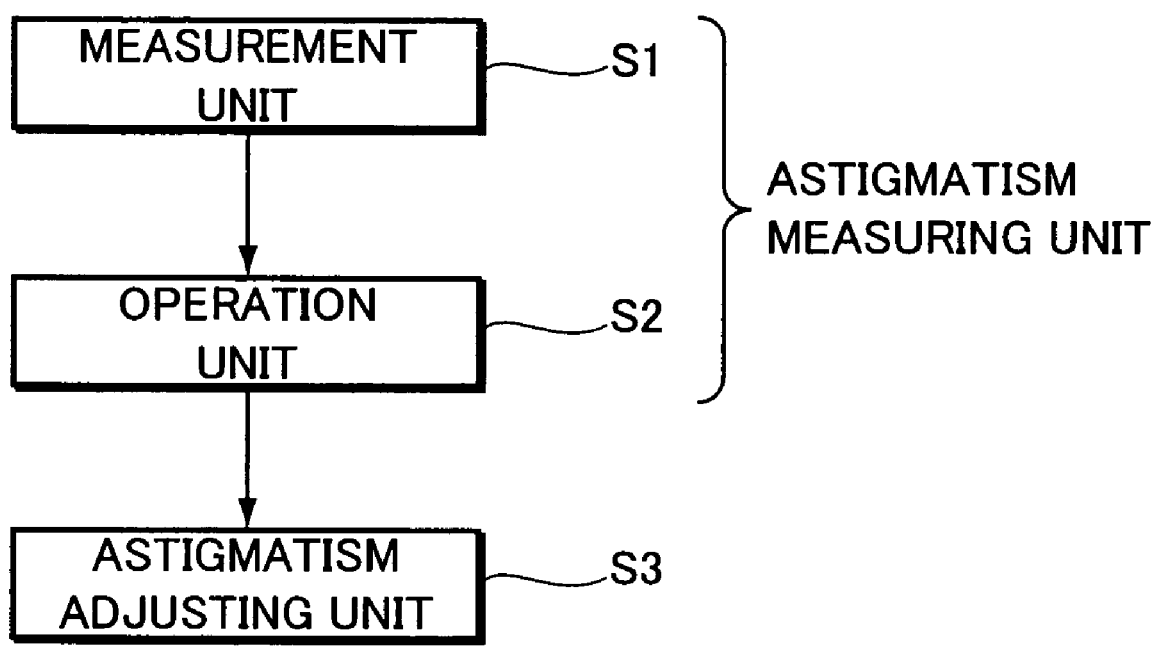
FIG. 8 is a block diagram of an object program according to the embodiment of the present invention.

FIG. 8 is a block diagram showing an object program set in the controller 3. Specifically, the controller 3 contains an object program related to measurement unit S1, operation unit S2, and astigmatism adjusting unit S3. Here, measurement unit S1 and operation unit S2 together form astigmatism measuring unit.

An operation of the astigmatism adjusting system having the above-discussed constitution will be described as follows. At first, the measurement unit S1 and the operation unit S2 shown in FIG. 8 measure an astigmatism of the optical pickup 5. Then, based on the measured astigmatism, the astigmatism adjusting unit S3 operates to drive the swinging actuators 6a and 6b to adjust an incident angle of the light beam entering the objective lens 54, thereby correcting the astigmatism.

Figure 9:
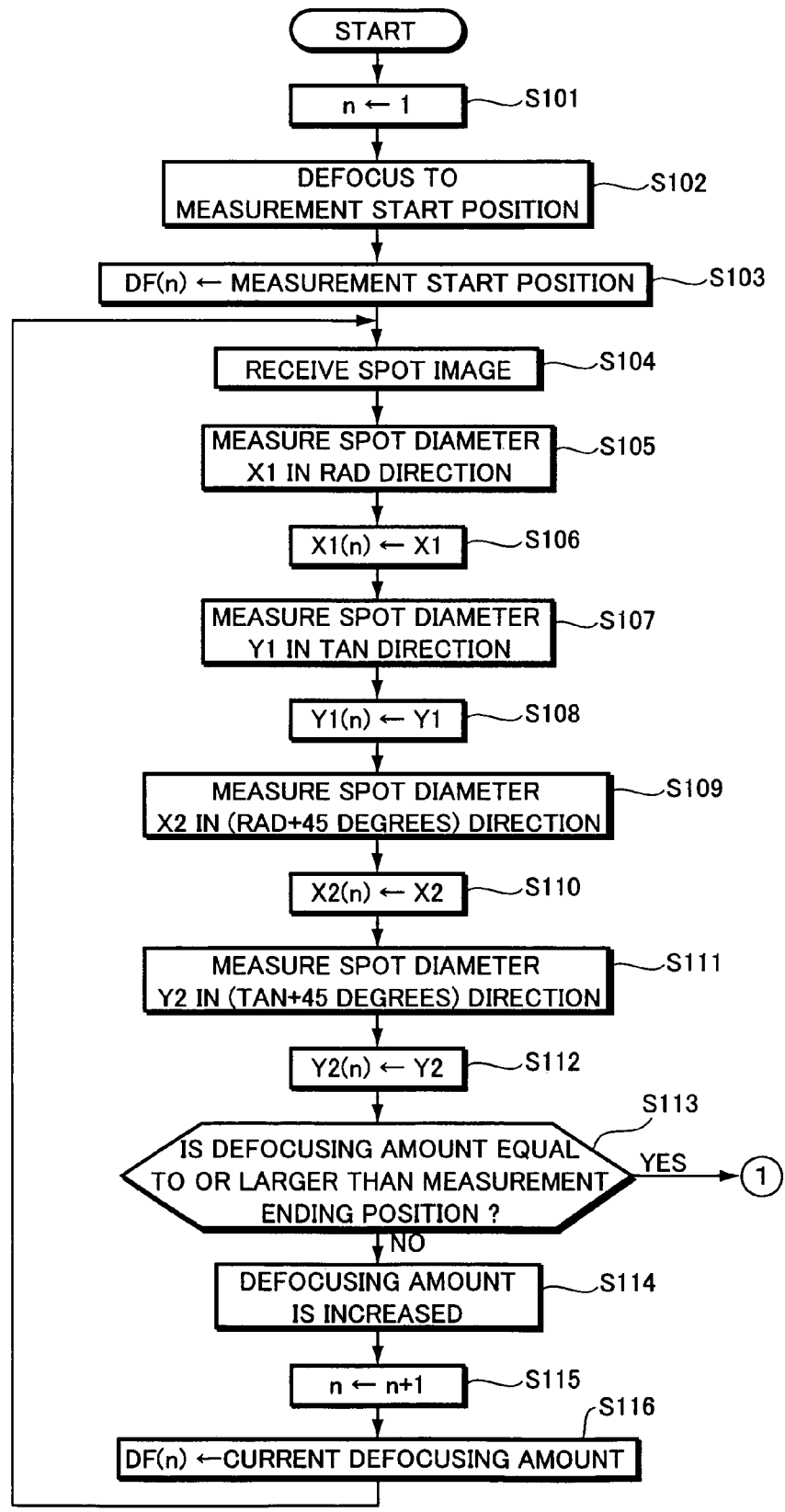
FIG. 9 is a flowchart showing an operation of the astigmatism adjusting system according to the embodiment of the present invention.
Figure 10:
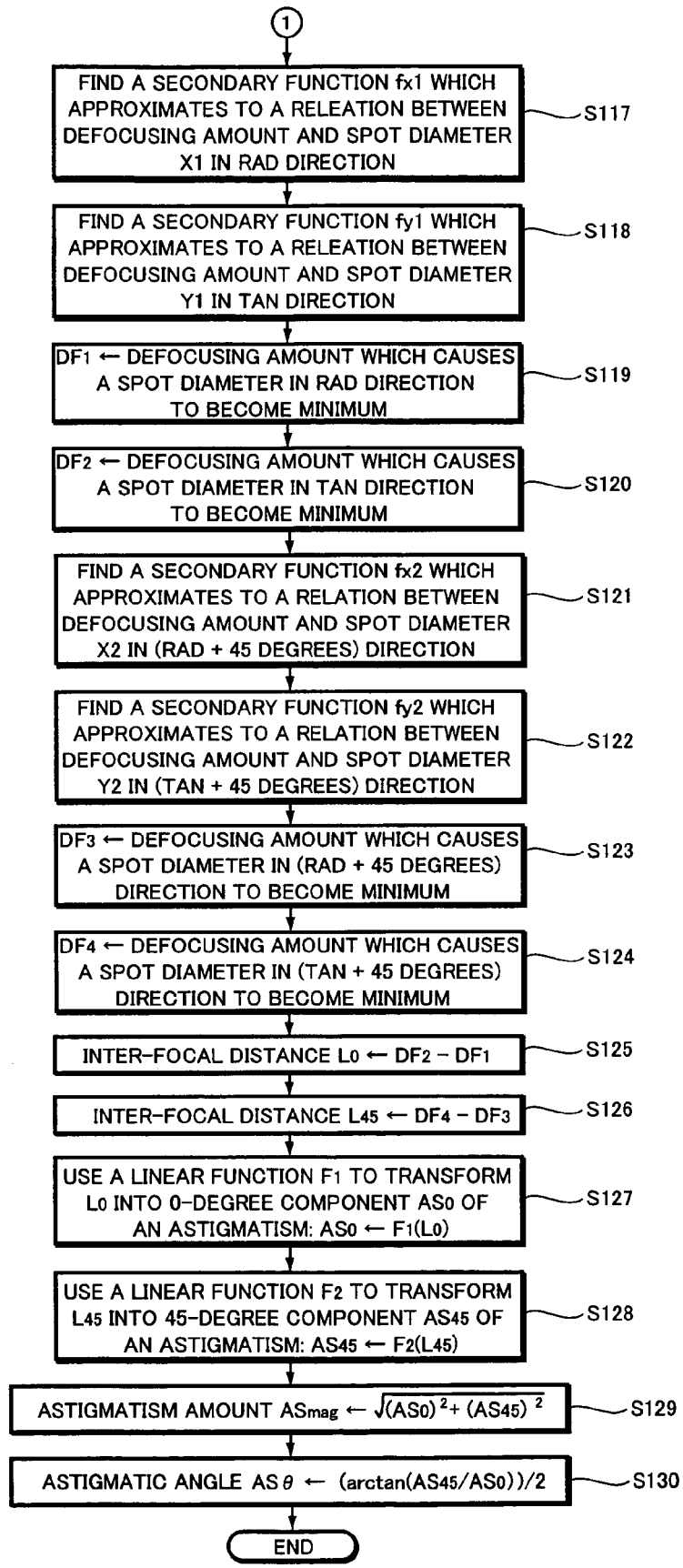
FIG. 10 is a flow chart further showing the operation of the astigmatism adjusting system according to the embodiment of the present invention.

Respective steps for performing the astigmatism adjustment will be described in detail in accordance with a flowchart shown in FIGS. 9 and 10.

Figure 11:
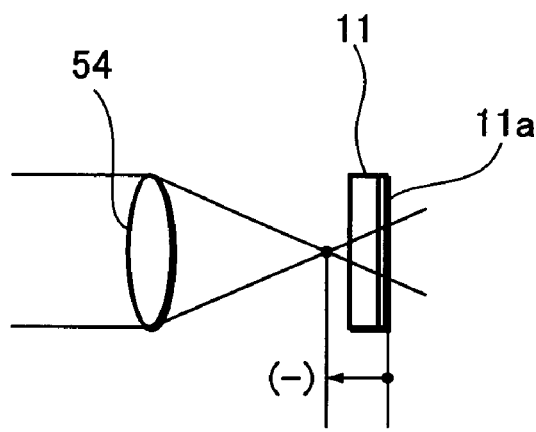
FIGS. 11A and 11B are explanatory views showing defocusing amount.
Figure 11:
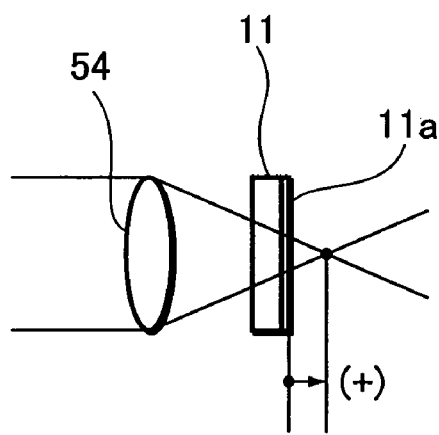

At first, at step S101, the measurement unit S1 initializes a counter variable n to 1. Then, at step S102, a command signal is outputted to the D/A converter 4c to drive the actuator 541, thereby defocusing the focal point of the objective lens 54 of the optical pickup 5 to a predetermined measurement start position. Here, a defocusing amount means a relative distance with respect to the half mirror surface 11a having a focal position at which a collimated light beam is converged by the objective lens 54. If the focal position of the collimated light beam is (far) on one side of the half mirror surface 11a of the cover glass 11 and close to the optical pickup 5 (as shown in FIG. 11A), a defocusing amount will be defined by negative sign (−). On the other hand, if the focal position of the collimated light beam is (near) on the other side of the half mirror surface 11a and close to the image processor 1, a defocusing amount will be defined by positive sign (+). Specifically, a defocusing amount when astigmatism measurement is started is −1.7 micrometers away from the half mirror surface 11a (however, it should not be limited to this value). Then, based on a relational expression (stored in advance) representing a relationship between a driving voltage value of the actuator 541 and a defocusing amount of the objective lens 54, the measurement unit S1 outputs a command signal to the D/A converter 4c to drive the actuator 541 so as to obtain a predetermined defocusing amount.

Next, at step S103, the defocusing amount is stored in an array variable DF(n), while a defocusing amount at measurement start is stored in an array variable DF(1).

Next, at step S104, the image processor 1 enlarges the spot image of the light beam projected on the half mirror surface 11a, by virtue of the imaging optical system 12, thereby forming an image on the CCD element 13. Subsequently, the measurement unit S1 receives (as image data) the spot image projected on the half mirror surface 11a.

Then, at step S105, the measurement unit S1 measures a spot diameter X1 of the spot image Pn in RAD direction shown in FIG. 2. At step S106, the spot diameter X1 is stored in an array variable X1(n).

Next, at step S107, the measurement unit S1 measures a spot diameter Y1 of the spot image Pn in TAN direction shown in FIG. 2. At step S108, the spot diameter Y1 is stored in an array variable Y1(n).

Subsequently, at step S109, the measurement unit S1 measures a spot diameter X2 of the spot image Pn in (RAD+45 degrees) direction shown in FIG. 4. At step S110, the spot diameter X2 is stored in an array variable X2(n).

Next, at step S111, the measurement unit S1 measures a spot diameter Y2 of the spot image Pn in (TAN+45 degrees) direction shown in FIG. 4. At step S112, the spot diameter Y2 is stored in an array variable Y2(n).

Then, at step S113, the above defocusing amount is compared with another defocusing amount obtained after the measurement has ended. Here, the defocusing amount obtained after the measurement has ended is +1.3 micrometers.

If the above defocusing amount is smaller than another defocusing amount obtained after the measurement has ended, the defocusing amount will be increased by 0.3–0.5 micrometers at step S114. Such an increase in the defocusing amount, as discussed above, can be effected as follows. Namely, the controller 3 produces a command signal, and the actuator 541 drives the objective lens 54 in a direction along the optical axis in accordance with the command signal. Then, at step S115, +1 increment of the variable n is carried out, while the defocusing amount added into the array variable DF(n) is stored at step S116. Afterwards, at steps S104–S112, various diameters of the spot image Pn are measured again.

In this way, the above measurement is performed while increasing the defocusing amount. At step S113, if it is determined that the defocusing amount is equal to or larger than a measurement ending position, operations from step S117 onwards are executed, as shown in FIG. 10.

Figure 12:
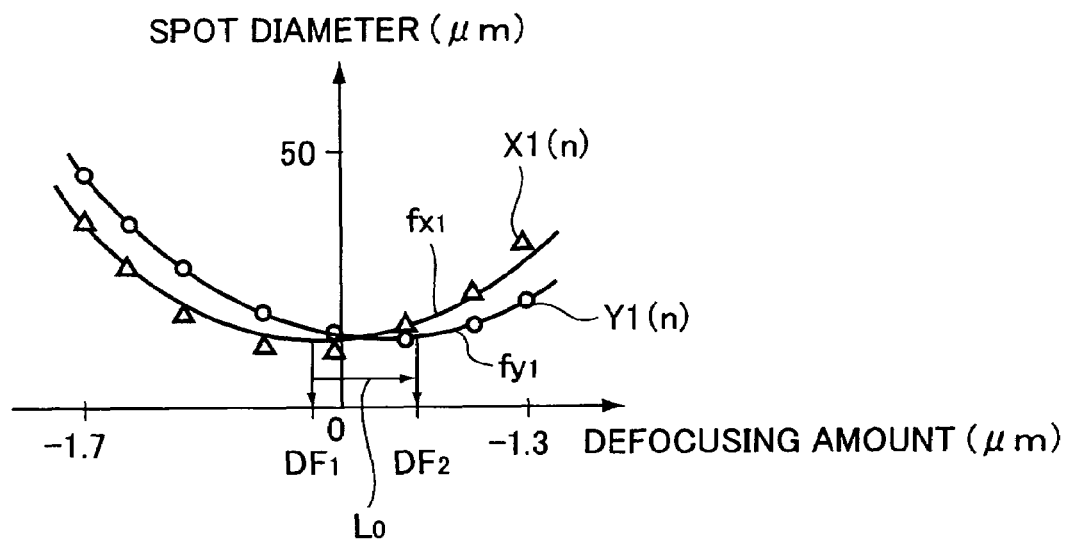
FIG. 12 is a graph showing a relationship between defocusing amount and spot diameter.

At steps S117–S120, as shown in FIG. 12, defocusing amounts causing respective spot diameters to become minimum are calculated using the measurement results of defocusing amount DF(n), spot diameter X1(n) in RAD direction, and spot diameter Y1(n) in TAN direction.

Specifically, at step S117, the measurement unit S1, using (for example) least-square method, finds a secondary regression curve fx1 which approximates to a relation between defocusing amount DF(n) and spot diameter X1(n) in RAD direction. Then, at step S118 similar to step S117, another secondary regression curve fy1 is found which approximates to a relation between defocusing amount DF(n) and spot diameter Y1(n) in TAN direction.

Then, at step S119, a value $DF_1$ corresponding to a defocusing amount where diameter X1(n) of spot image exhibits its minimum value is calculated in accordance with the regression curve fx1. Further, at step S120, a value $DF_2$ corresponding to a defocusing amount where diameter Y1(n) of spot image exhibits its minimum value is calculated in accordance with the regression curve fy1.

Figure 13:
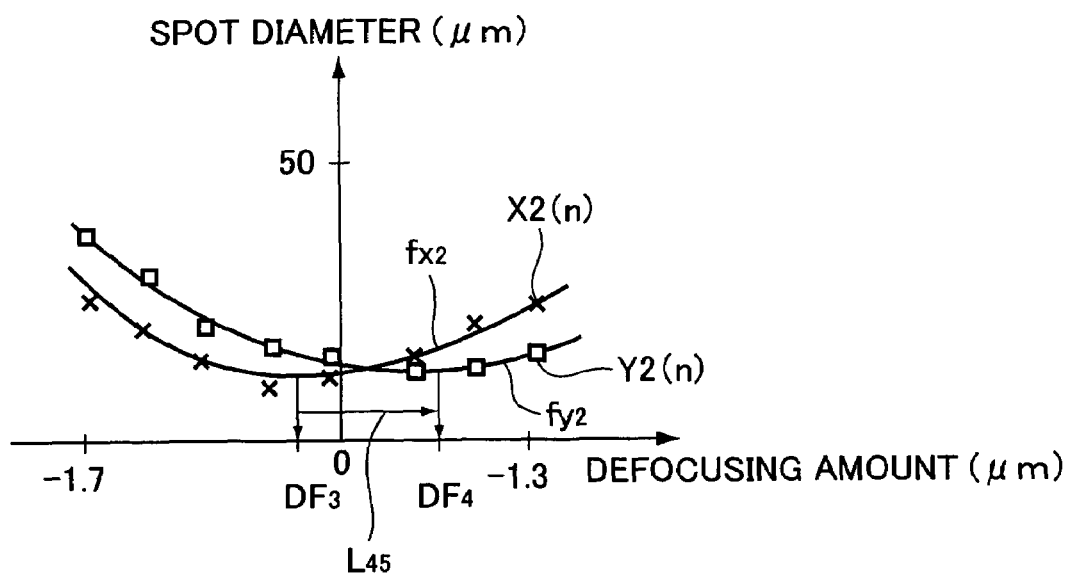
FIG. 13 is a graph further showing a relationship between defocusing amount and spot diameter.

Next, at steps S121–S124, as shown in FIG. 13, defocusing amounts causing respective spot diameters to become minimum are calculated using the measurement results of defocusing amount DF(n), spot diameter X2(n) in (RAD+45 degrees) direction, and spot diameter Y2(n) in (TAN+45 degrees) direction.

Specifically, at step S121, the measurement unit S1 finds a secondary regression curve fx2 which approximates to a relation between defocusing amount DF(n) and spot diameter X2(n) in (RAD+45 degrees) direction. Then, at step S122, another secondary regression curve fy2 is found which approximates to a relation between defocusing amount DF(n) and spot diameter Y2(n) in (TAN+45 degrees) direction.

Then, at step S123, a value $DF_3$ corresponding to a defocusing amount where diameter X2(n) of spot image exhibits its minimum value is calculated in accordance with the regression curve fx2. Further, at step S124, a value $DF_4$ corresponding to a defocusing amount where diameter Y2(n) of spot image exhibits its minimum value is calculated in accordance with the regression curve fy2.

Next, at step S125, the operation unit S2 finds an inter-focal distance $L_0$ between value $DF_2$ and value $DF_1$, in accordance with the following equation (1). Here, the focal distance $L_0$ is a distance between a focal point where the light beam is converged in RAD direction and a focal point where the light beam is converged in TAN direction orthogonal to RAD direction.

$$L_0 \leftarrow DF_2 - DF_1 \quad (1)$$

Then, at step S126, the operation unit S2 finds an inter-focal distance $L_{45}$ between value $DF_4$ and value $DF_3$, in accordance with the following equation (2). Here, the focal distance $L_{45}$ is a distance between a focal point where the light beam is converged in (RAN+45 degrees) direction and a focal point where the light beam is converged in (TAN+45 degrees) direction orthogonal to (RAD+45 degrees) direction.

$$L_{45} \leftarrow DF_4 - DF_3 \quad (2)$$

Next, at step S127, the operation unit S2 transforms the inter-focal distance $L_0$ by a linear function $F_1$ shown in the following equation (3), thereby finding 0-degree component $AS_0$ of an astigmatism.

$$AS_0 \leftarrow F_1(L_0) = -0.1871 L_0 - 0.0266 \quad (3)$$

Next, at step S128, the operation unit S2 transforms the inter-focal distance $L_{45}$ by a linear function $F_2$ shown in the following equation (4), thereby finding 45-degree component $AS_{45}$ of an astigmatism.

$$AS_{45} \leftarrow F_2(L_{45}) = -0.1967 L_{45} + 0.0318 \quad (4)$$

Here, transformation functions $F_1$ and $F_2$ are stored in advance in the controller 3. When it is necessary to measure an astigmatism of an optical pickup of the same type, the same transformation functions $F_1$ and $F_2$ will be used.

At step S129, the operation unit S2 calculates an astigmatic amount $AS_{mag}$ by calculating a square average of 0-degree component $AS_0$ and 45-degree component $AS_{45}$ of an astigmatism, in accordance with the following equation (5). Then, at step S130, an astigmatic angle $AS_\theta$ is calculated in accordance with the following equation (6).

$$AS_{mag} \leftarrow \sqrt{AS_o^2 + AS_{45}^2} \quad (5)$$

$$AS_\theta \leftarrow 1/2 \arctan \{AS_{45}/AS_0\} \quad (6)$$

Figure 14:
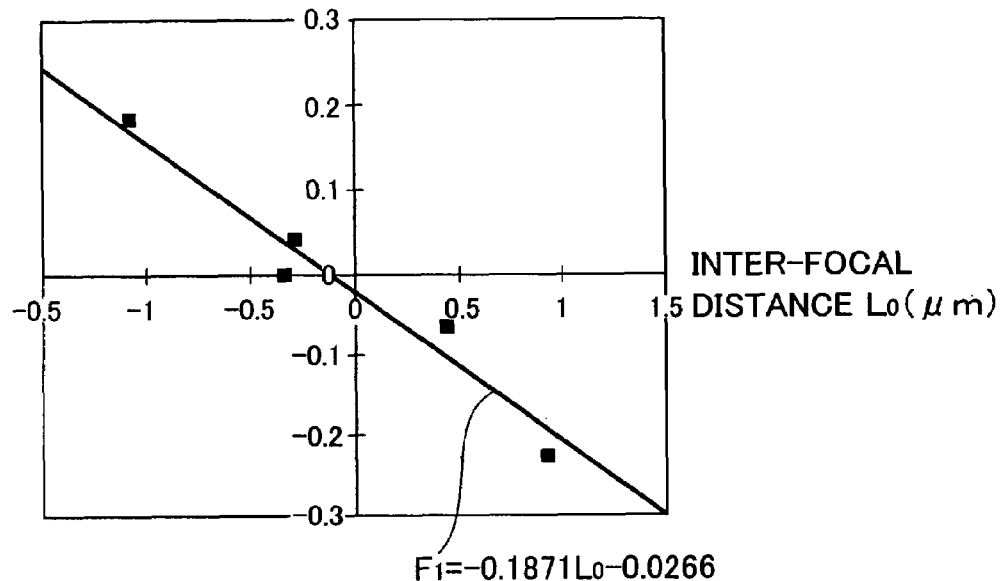
FIGS. 14A and 14B are graphs showing a correlation between inter-focal distances and astigmatisms measured by an interferometer.
Figure 14:
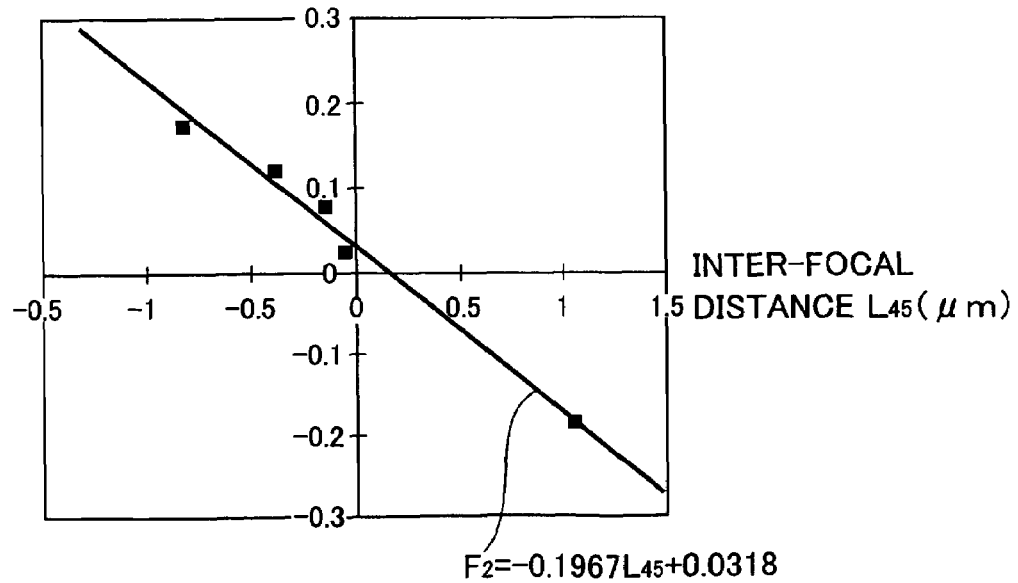

FIG. 14A is a graph showing (by marks) an intersection of an inter-focal distance $L_0$ found in this astigmatism measurement with 0-degree components (astigmatisms in RAD and TAN directions) of astigmatisms measured by an interferometer on a plurality of optical pickups. As shown in the graph, there is an extremely high correlation (for example, a correlation coefficient is 0.96) between an inter-focal distance $L_0$ and values measured by an interferometer. In fact, the transformation function $F_1$ of the above equation (3) is obtained by performing such measurement and approximating (by a linear function) a relation between an inter-focal distance $L_0$ and values measured by an interferometer. Namely, if an inter-focal distance is obtained and transformed with the transformation function $F_1$, it is possible to obtain a value corresponding substantially to an astigmatism component measured with an interferometer.

FIG. 14B is a graph showing (by marks) an intersection of an inter-focal distance $L_{45}$ found in this astigmatism measurement with 45-degree components {astigmatisms in (RAD+45 degrees) direction and (TAN+45 degrees) direction} of astigmatisms measured by an interferometer on a plurality of optical pickups. As shown in the graph, there is an extremely high correlation (for example, a correlation coefficient is 0.99) between an inter-focal distance $L_{45}$ and values measured by an interferometer. In fact, the transformation function $F_2$ of the above equation (4) is obtained by performing such measurement and approximating (by a linear function) a relation between an inter-focal distance $L_{45}$ and values measured by an interferometer. Namely, if an inter-focal distance is obtained and transformed with the transformation function $F_2$, it is possible to obtain a value corresponding substantially to an astigmatism component measured with an interferometer. Here, the unit of astigmatism is λ (wavelength of a measurement light used in an interferometer), and inter-focal distances $L_0$ and $L_{45}$ are converted (by transformation functions $F_1$, $F_2$) into values with the unit of astigmatism being λ.

In this way, by finding inter-focal distances $L_0$ and $L_{45}$ using measurement unit S1 and the operation unit S2, it is possible to measure astigmatism for the spot images received through the image processor 1.

Next, the astigmatism adjusting unit S3 shown in FIG. 8 operates in accordance with the obtained inter-focal distances $L_0$ and $L_{45}$ to drive the swinging actuator 6b so as to change the inclining angle of the reflection mirror 53 by ΔθRAD in RAD direction, as well as to change the inclining angle of the reflection mirror 53 by ΔθTAN in TAN direction. In fact, an angle changing amount of the reflection mirror 53, as discussed above, can be calculated in accordance with a relational expression representing a relationship between inter-focal distance and installation angle of the reflection mirror.

Here, the relational expression including $L_0$, $L_{45}$, and installation angle of the reflection mirror 53 is stored in advance in the controller 3. When it is necessary to measure an astigmatism of an optical pickup of the same type, the same relational expression will be used.

In this way, the astigmatism adjusting unit S3 operates in accordance with the above relational expression to calculate the inter-focal distances $L_0$ and $L_{45}$ so as to obtain an optimum angle for the reflection mirror 53, thereby performing an adjustment in accordance with the optimum angle and thus correcting an astigmatism. After the astigmatism adjustment is completed, the reflection mirror 53 is fixed in position by an adhesive agent.

Although the present embodiment has shown that a defocusing range in astigmatism measurement is −1.7 to +1.3 μm, the present invention should not be limited by such a range. For example, it is also possible to find a defocusing range through experiment, in order that a sufficient correlation (for example, a correlation coefficient is 0.8 or more) can be ensured between an inter-focal distance obtained in this astigmatism measurement and a astigmatism value measured by an interferometer.

Moreover, the above-discussed astigmatism adjustment can be applied not only to an optical pickup of DVD recording/reproducing apparatus, but also to an optical pickup of other optical disc recording/reproducing apparatus, such as CD (Compact Disc) or MO (Magneto Optical Disk) recording/reproducing apparatus.

In this way, the optical pickup astigmatism adjusting system of the present invention finds an inter-focal distance $L_0$ between a focal position where a light beam is converged in RAD direction and another focal position where a light beam is converged in TAN direction, and a further inter-focal distance $L_{45}$ between a focal position where a light beam is converged in a direction inclined 45 degrees from RAD direction and another focal position where a light beam is converged in a direction inclined 45 degrees from TAN direction. Since the inter-focal distances $L_0$ and $L_{45}$ has a correlation with 0-degree component and 45-degree component of each astigmatism, it is possible to measure an astigmatism of the optical pickup 5 by finding these inter-focal distances.

Moreover, since it is possible to measure 0-degree component and 45-degree component of each astigmatism by finding the inter-focal distances $L_0$ and $L_{45}$, it is possible to find an astigmatic amount (absolute value) and an astigmatic angle from these astigmatic components.

Moreover, since an astigmatism is measured based on the inter-focal distances $L_0$ and $L_{45}$, it is also possible to highly accurately perform an astigmatism measurement or adjustment on an optical pickup in a non-aberration (astigmatism is zero) state where the spot shape of a light beam is elliptical.

Moreover, since an astigmatism is corrected by adjusting the reflection mirror to a required angle based on the above-described measurement results and in accordance with a relational expression representing a relationship between inter-focal distances and an installation angle of the reflection mirror (which relational expression has been established in advance by calculation and experiment), it is possible to most appropriately adjust an astigmatism in only one step, thereby simplifying the adjustment process.

Besides, it is possible to realize an automated astigmatism measurement and adjustment by image-processing and measuring the spot diameters.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An method for measuring an astigmatism of an optical pickup which applies a light beam converged by an objective lens to a recording medium, the method comprising:
   a first step of finding a first position in an advancing direction of the light beam, which first position causes the beam diameter of the light beam to become minimum in a first direction orthogonal to the advancing direction of the light beam;
   a second step of finding a second position in an advancing direction of the light beam, which second position causes the beam diameter of the light beam to become minimum in a second direction orthogonal to both the advancing direction of the light beam and the first direction;
   a third step of finding a first distance representing a difference between the first position and the second position in the advancing direction of the light beam;
   a fourth step of finding a third position in the advancing direction of the light beam, which third position causes the beam diameter of the light beam to become minimum in a third direction orthogonal to the advancing direction of the light beam and inclining 45 degrees from said first direction;
   a fifth step of finding a fourth position in said advancing direction of the light beam, which fourth position causes the beam diameter of the light beam to become minimum in a fourth direction orthogonal to both the advancing direction of the light beam and the third direction; and
   a sixth step of finding a second distance representing a difference between said third position and said fourth position in said advancing direction of the light beam,
   wherein an astigmatism of the optical pickup is measured in accordance with said first distance and said second distance.

2. A method for adjusting an astigmatism of an optical pickup which applies a light beam converged by an objective lens to a recording medium, said method comprising:
   a first step of finding a first position in an advancing direction of the light beam, which first position causes the beam diameter of the light beam to become minimum in a first direction orthogonal to the advancing direction of the light beam;

a second step of finding a second position in an advancing direction of the light beam, which second position causes the beam diameter of the light beam to become minimum in a second direction orthogonal to both the advancing direction of the light beam and the first direction;

a third step of finding a first distance representing a difference between said first position and said second position in said advancing direction of the light beam;

a fourth step of finding a third position in said advancing direction of the light beam, which third position causes the beam diameter of the light beam to become minimum in a third direction orthogonal to said advancing direction of the light beam and inclining 45 degrees from said first direction;

a fifth step of finding a fourth position in said advancing direction of the light beam, which fourth position causes the beam diameter of the light beam to become minimum in a fourth direction orthogonal to both the advancing direction of the light beam and the third direction;

a sixth step of finding a second distance representing a difference between said third position and said fourth position in said advancing direction of the light beam; and a seventh step of measuring an astigmatism of the optical pickup in accordance with said first distance and said second distance, wherein the astigmatism of the optical pickup is adjusted in accordance with the measurement result obtained in said seventh step.

3. The method according to claim 2, wherein an incident angle of the light beam entering the objective lens is adjusted in accordance with said first distance and said second distance.

4. The method according to claim 2, wherein the beam diameter of the light beam is the diameter of spot image of the light beam.

5. A system for measuring an astigmatism of an optical pickup which applies a light beam converged by an objective lens to a recording medium, said apparatus comprising: measurement unit and operation unit, wherein the measurement unit is provided for measuring:

a first position in an advancing direction of the light beam, which first position causes the beam diameter of the light beam to become minimum in a first direction orthogonal to the advancing direction of the light beam;

a second position in an advancing direction of the light beam, which second position causes the beam diameter of the light beam to become minimum in a second direction orthogonal to both the advancing direction of the light beam and the first direction;

a third position in said advancing direction of the light beam, which third position causes the beam diameter of the light beam to become minimum in a third direction orthogonal to said advancing direction of the light beam and inclining 45 degrees from said first direction; and a fourth position in said advancing direction of the light beam, which fourth position causes the beam diameter of the light beam to become minimum in a fourth direction orthogonal to both the advancing direction of the light beam and the third direction, wherein the operation unit is provided for finding a first distance representing a difference between said first position and said second position in said advancing direction of the light beam, as well as a second distance representing a difference between said third position and said fourth position in said advancing direction of the light beam, wherein the astigmatism of the optical pickup is measured in accordance with said first distance and said second distance.

* * * * *